United States Patent Office 3,433,847
Patented Mar. 18, 1969

3,433,847
CONTINUOUS ALKYLATION PROCESS
Samuel J. Kahn, Rutherford, N.J., assignor to Universal Oil Products Company, Des Plaines, Ill., a corporation of Delaware
No Drawing. Filed Sept. 14, 1966, Ser. No. 579,209
U.S. Cl. 260—671
Int. Cl. C07c 15/02, 5/02
10 Claims

ABSTRACT OF THE DISCLOSURE

Para-(tertiaryalkyl) alkylbenzene can be prepared by alkylating an alkylbenzene with a tertiary olefin in the presence of a catalyst system containing sulfuric acid and a mixture of the alkylbenzene reactant and the para-(tertiaryalkyl) alkylbenzene. In this way para-(tertiarybutyl)-toluene can be prepared; para t-butyltoluene is useful as a precursor of terephthalic acid.

---

This invention relates to a continuous alkylation process and, more particularly, relates to a continuous process for the sulfuric acid catalyzed alkylation of alkylbenzenes with tertiary olefins to prepare para-(tertiaryalkyl) alkylbenzenes using a novel catalyst system.

The preparation of para-(tertiaryalkyl) alkylbenzenes, for example, para-tertiarybutyltoluene by the sulfuric acid catalyzed alkylation of alkylbenzenes with tertiary olefins is well known. It is also well known that this preparational reaction suffers from the disadvantage that substantial quantities of the meta isomer are produced which, because of the separational problems involved, deleteriously affects the satisfactory and economic obtainment of these valuable compounds. Moreover, in many of the ultimate uses of the para isomer, it is absolutely essential that the para isomer be substantially free of the meta isomer. Various procedures have been suggested for effecting this alkylation reaction so as to maximize yield and minimize the undesired meta isomer formation. These procedures usually involve a combination of a critical temperature range, a particular ratio of both reactants to each other and to the sulfuric acid catalyst and, frequently, also quick termination of the reaction, such as by water quenching. While certain of these prior art procedures are effective in minimizing the meta isomer formation, they are nevertheless of little practical value for large scale operation as they are limited, by virtue of their specific procedures, to a batch-type operation in order to achieve their principal objective of low meta isomer formation. It has now been discovered, however, that para-(tertiaryalkyl) alkylbenzenes may be produced in a continuous process using a sulfuric acid catalyzed alkylation reaction with very high yields and very low meta isomer formation at levels comparable to that obtained in the more limited batch-type operations.

Accordingly, an object of this invention is to provide a continuous process for the preparation of para-tertiaryalkyl) alkylbenzenes using a sulfuric acid catalyzed alkylation reaction. Another object is to provide such a continuous alkylation process using a unique catalyst system whereby the product is obtained substantially free of the undesired meta isomer and in an economical and a highly desirable industrial fashion. These and other objects of this invention will be apparent from the following further detailed description thereof.

The above objects are achieved according to the process of this invention by effecting the alkylation of an alkylbenzene with a tertiary olefin in the presence of a novel catalyst system consisting of sulfuric acid catalyst and a mixture of the para-(tertiaryalkyl) alkylbenzene product and the alkylbenzene reactant in which the product and the reactant are maintained continuously in a specific mol ratio. This mol ratio of reactant to product in the catalyst system is very important to the success of the process and it is critical that the alkylbenzene reactant be present in a ratio of at least above about 0.1 mol per one mol of the para-(tertiaryalkyl) alkylbenzene product. The upper limit of the ratio is not critical and may range up to about 2 mols of the reactant per one mol of the product. Ratios above this level should be avoided, however, as large volumes for the catalyst system do not necessarily achieve better results and usually only add to the overall cost of the process. A particularly preferred ratio for maximizing the yield of product and minimizing the formation of the undesired meta isomer, as well as for convenience of operation, is a ratio of substantially about one mol of the alkylbenzene reactant per one mol of the para-(tertiaryalkyl) alkylbenzene product. The amount of sulfuric acid catalyst contained in the catalyst system is not critical and generally an amount of sulfuric acid ranging from about 2 to 20 mol percent, based upon the total number of mols of the alkylbenzene reactant and the para-(tertiaryalkyl) alkylbenzene product in the catalyst system, is satisfactory for most purposes. While the amount of the sulfuric acid catalyst is not critical, the yield of the desired product decreases and the formation of the undesired meta isomer increases as the quantity of catalyst exceeds much above about 20 mol percent. For this reason, a more limited range of about 5 to 15 mol percent or about 10 mol percent of sulfuric acid catalyst is preferred for the catalyst system.

The desired mol ratio of the alkylbenzene reactant to the para-(tertiaryalkyl) alkylbenzene product in the catalyst system may be established and maintained during continuous operation by several different methods including, for example, using several different feed streams to an alkylation zone of a reactor containing the catalyst system. A particularly simple method according to this invention, however, involves utilizing the stoichiometry of the reaction and controlling the mol ratio of the reactants charged to the alkylation zone as well as the mol ratio of product to alkylbenzene reactant withdrawn from the alkylation zone. For example, by charging the alkylbenzene and the tertiary olefin reactants, which react on an equimolar basis, to the alkylation zone in a ratio of at least above about 1.1 mols of alkylbenzene per mol of tertiary olefin, one mol of product will be produced in the alkylation zone consuming all of the olefin charged and one mol of alkybenzene charged. This leaves that portion of the alkylbenzene charge above one mol together with the one mol of formed product to replenish the catalyst system. By then withdrawing the alkylbenzene reactant and the para-(tertiaryalkyl) alkylbenzene product from the alkylation zone in a mol ratio of at least above about 0.1 mol of alkylbenzene per mol of product, the desired mol ratio for the catalyst system may be continuously maintained. Various mol ratios for the catalyst system may thus be easily maintained continuously in the alkylation zone. For example, if a ratio of about one mol of alkylbenzene reactant per one mol of product is desired for the catalyst system, then the reactants will be charged to the alkylation zone in a ratio of about two mols of alkylbenzene per one mol of tertiary olefin and the product and alkylbenzene will be withdrawn from the alkylation zone in approximately a one to one mol ratio, or, if a ratio of about two mols of alkylbenzene reactant per one mol of product is desired, then the reactants will be charged to the alkylation zone in a ratio of about three mols of alkylbenzene per one mol of olefin and the product and the alkylbenzene will be withdrawn from the alkylation zone in a mol ratio of approximately one to two, respectively.

It is, of course, apparent that in this very simple method of continuously maintaining the desired mol ratio of the catalyst system, the mol ratio, under steady state conditions, is primarily a function of the mol ratio of the reactants charged to the alkylation zone. For this reason, when this simple method of control is used, the reactants must be charged to the alkylation zone in a mol ratio of at least above about 1.1 mols of the alkylbenzene per mol of the tertiary olefin in order to maintain the minimum mol ratio of alkylbenzene to product of 0.1 to 1, respectively, required for the catalyst system. The mol ratio of the reactants may be, and preferably is, higher than this minimum level and for obtaining the preferred mol ratio for the catalyst system as described above, of namely about one mol of alkylbenzene per one mol of product, the ratio of reactants charged to the alkylation system preferably is about two mols of the alkylbenzene per one mol of tertiary olefin. The ratio of reactants can, of course, be higher than this level, but, for the reasons indicated above, having large volumes for the catalyst system serves primarily only to raise the overall cost of the process and consequently should be avoided. The mol ratio of alkylbenzene to product withdrawn from the alkylation zone is, of course, under steady state condition when using this simple method of control, primarily determined by the ratio of reactants charged to the system and will substantially equal the mol ratio of alkylbenzene to product in the catalyst system.

The conditions used for effecting the alkylation reaction are not critical and the conditions commonly employed for liquid phase sulfuric acid alkylation of alkylbenzenes with olefins may be satisfactorily utilized for the continuous process of this invention. Generally, the temperature may range from about −20° to 15° C. with a more limited range of from about 0° to 5° C. being preferred, especially for the obtainment of a high product yield with low concomitant formation of the undesired meta isomer. The rate at which the tertiary olefin and alkylbenzene in the desired mol ratio are charged to the alkylation zone will vary depending upon such variable factors as the specific compounds reacted, the volumes of the reactants and the catalyst system, and the amount of sulfuric acid catalyst present in the catalyst system. Generally, the charge rate for a combination feed stream of both the olefin and alkylbenzene to the alkylation zone may range from about 0.1 to 10 pounds per hour per pound of sulfuric acid catalyst with a more limited range of about 0.3 to 5 pounds per hour per pound of sulfuric acid catalyst being preferred.

The alkylbenzene reactant should preferably be a mono alkylbenzene and preferably a mono lower alkylbenzene in which the alkyl portion contains from 1 to about 5 carbon atoms. Examples of the mono alkylbenzenes include toluene, ethylbenzene, propylbenzene or butylbenzene. The tertiary olefin reactant which may be used includes olefins containing from 4 to about 5 carbon atoms such as isobutylene or isoamylenes. Examples of the para-(tertiaryalkyl) alkylbenzenes which may be prepared in the process by the alkylation of the above illustrated alkylbenzenes with the illustrated tertiary olefins include para-tertiarybutyltoluene, para-tertiarybutylethylbenzene, para-tertiarybutylpropylbenzene or para-tertiaryamyltoluene. The sulfuric acid catalyst used in the catalyst system is the conventional catalyst used in alkylation reactions which is concentrated acid preferably ranging above about 90 percent by weight of sulfuric acid.

One illustrative procedure for carrying out the process of this invention to prepare a para-(tertiaryalkyl) alkylbenzene, for example, para-tertiarybutyltoluene, comprises continuously charging, at an appropriate rate, toluene and isobutylene, in single or separate streams and in the desired mol ratio to a suitable reactor. The reactor contains, in an alkylation zone therein, the catalyst system comprising sulfuric acid and the mixture of toluene and para-tertiarybutyltoluene in the desired ratio. The catalyst system is maintained at the desired temperature and continuously stirred. The steady state effluent from the reactor comprising a mixture of toluene and para-tertiarybutyltoluene is continuously withdrawn from the system in a mol ratio approximately equal to the mol ratio of the toluene to the para-tertiarybutyltoluene in the catalyst system. Due to density and solubility factors, use of a simple settling leg in the upper portion of the reactor permits ready separation of the effluent from the sulfuric acid which can then continuously return to the alkylation zone. This also allows the steady state effluent to be continuously withdrawn from an upper portion of the reactor substantially free of sulfuric acid contamination, thus making separation of the para-tertiarybutyltoluene from the toluene both economical and uncomplicated. Such separation may be effected by various means including, for example, continuously charging the effluent to distillation and fractionation equipment to recover the para-tertiarybutyltoluene product from the toluene substantially free of the corresponding meta isomer. The toluene may then, if desired, be recycled. In continuous operation, in order to obtain maximum yields of the desired para isomer, it is preferred that the sulfuric acid catalyst portion of the catalyst system be occasionally replaced or partially replaced with fresh acid. The replacement rate of acid will, of course, vary depending upon such factors as the reactants, the volumes of the catalyst system and the type of alkylation equipment.

The following example is offered to illustrate the process of this invention and the catalyst system therefor. It is not intended, however, to limit the invention to the specific reactants, conditions or catalyst system described therein.

Example

The process of this invention for preparing para-(tertiaryalkyl) alkylbenzenes was conducted according to the following procedure to prepare para-tertiarylbutyltoluene:

A one liter reactor equipped with cooling and mixing means and inlet and outlet ports was initially charged with 533 grams (3.6 mols) of para-tertiarybutyltoluene, 330 grams (3.6 mols) of toluene and 66 grams (0.625 mol) of concentrated (93%) sulfuric acid. With adequate stirring to effectively mix the catalyst system, the reactor was cooled to about 0° to 5° C. and while maintaining such temperature a precooled feed comprising toluene and isobutylene in a mol ratio of 2 to 1, respectively, was charged at a rate of about 3 grams per minute to a low point of the reactor. The effluent from a settling leg in an upper portion of the reactor, comprising a substantially acid-free mixture of toluene and para-tertiarybutyltoluene, was collected. The run was continued for a period of 27 hours during which time 3680 grams (40 mols) of toluene and 1120 grams (20 mols) of isobutylene were charged to the reactor and a total of 4800 grams of reactor effluent were collected. During the run, ½ of the sulfuric acid was replaced four times with a fresh quantity of acid. The collected effluent was fractionally distilled first atmospherically to 160° C. to recover a toluene fraction and then at 20 mm. Hg to recover a para-tertiarybutyltoluene fraction. The toluene fraction amounted to 1938 grams (21.1 mols) and analysis by gas-liquid chromatography indicated negligible foreign materials. The para-tertiarybutyltoluene fraction, having a refractive index $n_D^{20}$ of 1.4910, amounted to 2746 grams (18.58 mols). This fraction analyzed by gas-liquid chromatography as 97.0 to 97.2 percent para-tertiarybutyltoluene and 2.8 to 3.0 percent of the meta isomer. Accordingly, the yield on consumed toluene was 98.2 percent of theory and on consumed isobutylene was 92.9 percent of theory.

I claim as my invention:

1. A continuous process for preparing a para-(tertiaryalkyl) alkylbenzene which comprises charging an alkylbenzene and a tertiary olefin in a ratio of at least above about 1.1 mol of alkylbenzene per mol of olefin to an alkylation zone, reactively contacting them therein at a temperature of from about —20° to 15° C. in the presence of a catalyst system initially containing sulfuric acid and a mixture of said alkylbenzene and said para-(tertiaryalkyl) alkylbenzene maintained in a ratio of at least above about 0.1 mol of alkylbenzene per one mol of said para-(tertiaryalkyl) alkylbenzene, withdrawing from the alkylation zone a mixture of said alkylbenzene and said para-(tertiaryalkyl) alkylbenzene in an amount adjusted to maintain the desired mol ratio of alkylbenzene and para-(tertiaryalkyl) alkylbenzene in the catalyst system, and thereafter recovering said para-(tertiaryalkyl) alkylbenzene from said alkylbenzene.

2. The process according to claim 1 characterized in that the catalyst system contains sulfuric acid in an amount ranging from about 2 to 20 mol percent based upon the total number of mols of alkylbenzene and para-(tertiaryalkyl) alkylbenzene in the system.

3. The process according to claim 1 characterized in that the temperature ranges from about 0° to 5° C.

4. The process according to claim 1 characterized in that a mono alkylbenzene and the tertiary olefin are charged to the alkylation zone in a mole ratio of about 2 to 1, respectively.

5. The process according to claim 1 characterized in that para-tertiarybutyltoluene is prepared by charging toluene and isobutylene to the alkylation zone.

6. The process according to claim 1 characterized in that para-tertiarybutyltoluene is prepared by charging toluene and isobutylene in a mole ratio of about 2 to 1, respectively, to the alkylation zone, reactively contacting them therein at a temperature of from about 0° to 5° C. in the presence of the catalyst system containing sulfuric acid and a mixture of toluene and para-tertiarybutyltoluene maintained in a mol ratio of about 1 to 1, respectively, withdrawing from the reaction zone a mixture of toluene and para-tertiarybutyltoluene in an amount adjusted to maintain the desired ratio of toluene and para-tertiarybutyltoluene in the catalyst system, and thereafter recovering the para-tertiarybutyltoluene from the toluene.

7. The process according to claim 6 characterized in that the catalyst system contains sulfuric acid in an amount ranging from about 2 to 20 mol percent based upon the total number of mols of toluene and para-tertiarybutyltoluene in the system.

8. A catalyst system for effecting the continuous preparation of para-(tertiary-alkyl) alkylbenzenes by the alkylation of an alkylbenzene with a tertiary olefin which comprises sulfuric acid and a mixture of the alkylbenzene and the para-(tertiary-alkyl) alkylbenzene, said mixture being maintained in a ratio of at least above about 0.1 mol of alkylbenzene per mol of said para-(tertiaryalkyl) alkylbenzene, said catalyst system being present at the initiation of the alkylation reaction.

9. The catalyst system according to claim 8 characterized in that the sulfuric acid is present in an amount ranging from about 2 to 20 mol percent based upon the total number of mols of the alkylbenzene and the para-(tertiaryalkyl) alkylbenzene present in the mixture.

10. The catalyst system according to claim 9 characterized in that the alkylbenzene is toluene, the tertiary olefin is isobutylene and the para-(tertiaryalkyl) alkylbenzene is para-tertiarybutyltoluene.

References Cited

UNITED STATES PATENTS 2,867,674    1/1959    Patinkin et al. _____ 260—671

DELBERT E. GANTZ, *Primary Examiner.*

CURTIS R. DAVIS, *Assistant Examiner.*